United States Patent Office 3,763,261
Patented Oct. 2, 1973

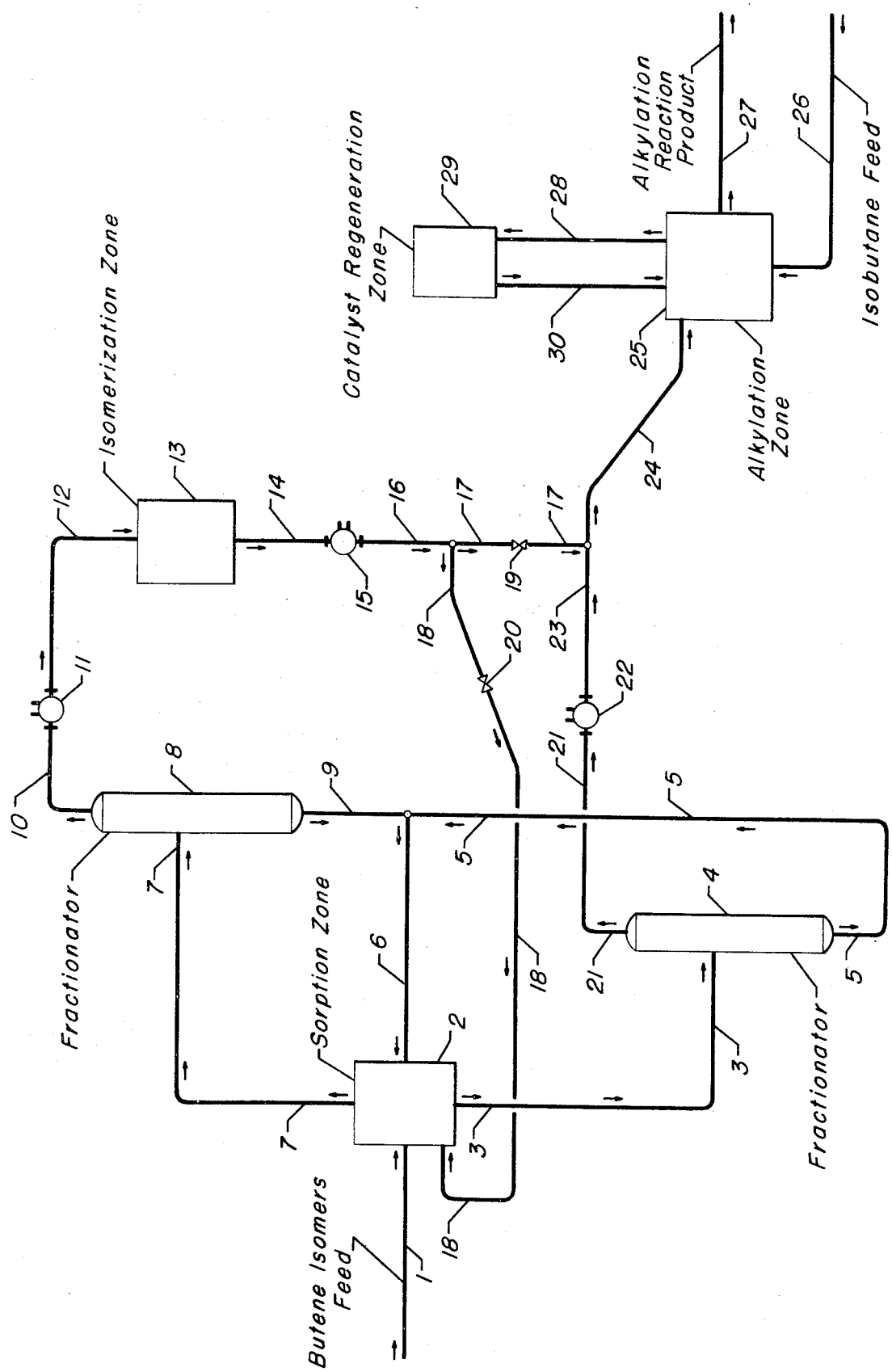

3,763,261
BUTENE SEPARATION, ISOMERIZATION
AND ALKYLATION
Jay E. Sobel, Highland Park, Ill., assignor to Universal
Oil Products Company, Des Plaines, Ill.
Filed Dec. 1, 1971, Ser. No. 203,803
Int. Cl. C07c *3/52, 3/54*
U.S. Cl. 260—683.49                                    7 Claims

ABSTRACT OF THE DISCLOSURE

A process for producing an alkylation reaction product from an isoparaffin and an olefinic reactant containing 1-butene, 2-butene and isobutylene by separating the reactant, using a crystalline aluminosilicate, to provide a 1-butene stream and a 2-butene-isobutylene stream; alkylating the 2-butene-isobutylene stream; and isomerizing the 1-butene stream to form additional 2-butene isomer for the alkylation step.

BACKGROUND

This invention relates to a process for producing an alkylation reaction product from an isoparaffinic reactant and an olefinic reactant containing 1-butene, 2-butene and isobutylene. In one aspect, this invention relates to the separation and alkylation of butene isomers. In another aspect, this invention relates to the separation, isomerization and alkylation of 1-butene. In still another aspect, this invention relates to the alkylation of commingled 2-butene and isobutylene in the absence of 1-butene. More particularly, this invention relates to a process for producing an alkylation reaction product, having excellent properties as a motor fuel component, from an isoparaffin and a mixture of 1-butene, 2-butene and isobutylene, by separating the mixture to provide a 1-butene stream and a 2-butene-isobutylene stream; contacting the 1-butene stream with an isomerization catalyst in an isomerization zone; contacting the effluent from the isomerization zone and the 2-butene-isobutylene stream with an alkylation catalyst in an alkylation zone; and, recovering the alkylation reaction product from the effluent from the alkylation zone.

The use of catalytic alkylation processes to produce gasoline-boiling-range isopraffins having valuable antiknock properties and suitable as motor fuel blending components is well known in the petroleum refining art. Generally, the alkylation of isoparaffins with olefins is accomplished by contacting the reactants with an acid-acting catalyst such as hydrogen fluoride or sulfuric acid, settling the resulting mixture to separate the catalyst, and further separating hydrocarbons, for example by fractionation, to recover the product. The alkylation reaction product, normally a mixture of $C_6$-$C_{10}$ saturates, is called alkylate. Alkylate is typically a mixture of isomers of heptane, octane, etc., the composition depending upon the particular isoparaffinic and olefinic reactants utilized. In commercial alkylation processes, the isopraffin employed is normally isobutane, while the olefinic reactant is usually a mixture of 1-butene, 2-butene and isobutylene or a mixture of the above butenes with amylenes and/or propylene. The more highly branched hydrocarbons such as trimethylpentanes are preferred products of alkylation processes rather than less branched hydrocarbons such as dimethylhexanes, because the more highly branched hydrocarbons provide a higher octane motor fuel.

The isomerization of olefins is also known. The double bond present in olefinic hydrocarbons is generally labile and shifts readily over various catalysts. For example, the carbonylation, or oxo, process has been utilized to produce internal olefins from alpha olefins. Composites of a metal from Group VIII of the Periodic Table with a refractory inorganic oxide are also well known as catalysts in producing olefinic bond migration. The commercial isomerization of 1-butene to 2-butene has heretofore been considered impractical because of the difficulty of separating 1-butene from the other butene isomers with which it is invariably associated in commercially available sources.

It is known in the art that crystalline aluminosilicates are useful for separating hydrocarbons. Particularly, some Type X and Type Y zeolites have been disclosed for use in the separation of olefins from paraffinic hydrocarbons and the separation of 1-butene from isobutylene (see U.S. Pat. 3,531,539, Class 260—677).

SUMMARY OF THE INVENTION

It is an object of this invention to provide an improved reaction product in an isoparaffin-olefin alkylation process. It is a further object of this invention to provide an economical method for separating, isomerizing and alkylating butene isomers.

In an embodiment, the present invention relates to a process for producing an alkylation reaction product from an isoparaffinic reactant and an olefinic reactant containing 1-butene, 2-butene and isobutylene, which process comprises the stpes of: (a) separating said olefinic reactant to provide a 1-butene stream and a 2-butene-isobutylene stream; (b) contacting at least a portion of said 1-butene stream with an isomerization catalyst in an isomerization zone at isomerization conditions; (c) contacting at least a portion of said 2-butene-isobutylene stream and at least a portion of the effluent from said isomerization zone with said isoparaffinic reactant and with an alkylation catalyst in an alkylation zone at alkylation conditions; and (d) recovering said alkylation reaction product from the effluent from said alkylation zone.

I have discovered that the alkylation of a mixture of 2-butene and isobutylene with an isoparafin results in an alkylation reaction product which is superior to the alkylation reaction product obtained when 2-butene and isobutylene are alkylated separately and the resulting alkylation reaction products combined. Moreover I have found that the synergistic effect of alkylating 2-butene and isobutylene together is further enhanced when the alkylation of the 2-butene-isobutylene mixture is undertaken in the absence of 1-butene. By separating 1-butene from the mixture of butene isomers normally utilized as the olefinic reactant in an isoparaffin-olefin alkylation process, and subsequently alkylating the resulting 2-butene-isobutylene mixture, an improved alkylation reaction product is recovered. The 1-butene which is separated from the conventional olefinic reactant is isomerized to yield 2-butene, re-combined with the previously separated 2-butene and isobutylene, and the resulting mixture of 2-butene and isobutylene is utilized in an alkylation reaction to provide an improved alkylation reaction product.

DESCRIPTION OF THE DRAWINGS

The attached drawing is a schematic representation of one embodiment of the present invention. Referring to the drawing, butene isomers feed, containing 1-butene, 2-butene and isobutylene is passed through conduit 1 into sorption zone 2. In sorption zone 2, the butene isomer feed is contacted with a Type X zeolite sorbent containing a barium cation at cationic sites within the zeolite. Sorption conditions in sorption zone 2 include a temperature of about 50° F.–150° F. and a pressure sufficient to maintain 1-butene, 2-butene and isobutylene in the liquid phase. 1-butene from the butene isomers feed is selectively adsorbed by the zeolite sorbent, leaving a raffinate comprising 2-butene and isobutylene in the void space between particles of the sorbent. A purging stream of 20 vol. percent 1-octene and 80 vol. percent isooctanes is charged to sorption zone 2 through conduit 6, and is utilized to purge the raffinate from sorption zone 2. The combined purging stream and raffinate of 2-butene and isobutylene are withdrawn from sorption zone 2 by way of conduit 3 and passed into fractionator 4. In fractionator 4, the raffinate is separated from the purging stream. A stream of 2-butene and isobutylene is recovered in the overhead vapor from fractionator 4 through conduit 21. 1-octene and iso-octanes are recovered in the bottoms from fractionator 4 and passed through conduit 5 to conduit 6 whereby the hydrocarbons are re-introduced into sorption zone 2. The stream of 20 vol. percent 1-octene and 80 vol. percent iso-octane from conduit 6 is utilized in sorption zone 2, to desorb 1-butene from the zeolite sorbent to provide an extract stream. The extract stream, comprising 1-butene, 1-octene and iso-octanes, is withdrawn from sorption zone 2 through conduit 7, and charged to fractionator 8. In fractionator 8, 1-butene is separated in the overhead vapors and recovered through conduit 10. 1-octene and iso-octane are recovered in the bottoms from fractionator 8 and passed through conduit 9 to conduit 6 for further continuous use in purging and desorption as described. The 1-butene stream in conduit 10 is passed into cooler 11 and therein cooled and liquified. The liquified 1-butene is passed through conduit 12 to isomerization zone 13. In isomerization zone 13, the 1-butene stream is passed continuously over a fixed bed of an isomerization catalyst comprising a crystalline aluminosilicate combined with a substantially anhydrous boron trifluoride. Depending upon the isomerization conditions employed, particularly with respect to temperature and pressure, the 1-butene stream may be only partially converted into 2-butene, and possibly, isobutylene, in isomerization zone 13 or the 1-butene stream may be substantially completely converted to the other butene isomers. The isomerate is withdrawn from isomerization zone 13 through conduit 14 and passed into cooler 15, wherein the isomerization zone effluent is further cooled. The cooled isomerization zone effluent is withdrawn from cooler 15 through conduit 16. As stated, either a partial isomerization or a substantially complete isomerization of 1-butene may be effected in isomerization zone 13. If it is desired to effect only a partial isomerization of the 1-butene, the effluent from the isomerization zone will contain a fraction of 1-butene. In this case, valve 19 is closed, blocking conduit 17, and valve 20 is opened, allowing the cooled isomerization zone effluent to pass through conduit 18 to sorption zone 2. The isomerization zone effluent is separated, in sorption zone 2, with or without the addition of fresh butene isomers feed. The remaining 1-butene is separated from 2-butene and isobutylene in the isomerization zone effluent, and passed once more to isomerization zone 13, as described above with respect to 1-butene in the butene isomers feed. 2-butene and isobutylene are separated and withdrawn via conduit 3, also as described above in connection with separation of butene isomers feed. If, on the other hand, it is desired or possibly to effect substantially complete isomerization of 1-butene to 2-butene, and possibly isobutylene, in isomerization zone 13, valve 20 is closed, and valve 19 is opened, allowing the cooled isomerization zone effluent to pass through conduit 17. The 2-butene-isobutylene stream in conduit 21 is passed into cooler 22 and condensed and cooled therein. The condensed stream is withdrawn from cooler 22 and passed through conduit 23 to conduit 24. As noted above, the effluent from isomerization zone 13 may be passed through conduit 17 or conduit 18. When it is desired to pass the isomerization zone effluent through conduit 17, it is thereby introduced into conduit 24 and combined therein with the hydrocarbon stream from conduit 23. In any case, the stream of 2-butene and isobutylene in conduit 24 is introduced into alkylation zone 25. Isobutane is passed into alkylation zone 25 through conduit 26. Isobutane from conduit 26 and butenes from conduit 24 are co-mixed and contacted with hydrogen fluoride alkylation catalyst at alkylation conditions including a temperature of about 0° F. to about 100° F. and a pressure sufficient to maintain the reactants, catalyst and alkylation reaction products in the liquid phase. After the catalyst and hydrocarbons have been contacted for a time sufficient to allow substantially complete reaction of olefins charged, the mixture of hydrocarbons and alkylation catalyst is settled to provide a hydrocarbon phase and a catalyst phase. The hydrocarbon phase is withdrawn from alkylation zone 25 through conduit 27, and passed to a conventional alkylate separation apparatus for further separation of the alkylation reaction product. The catalyst phase is further employed to catalyze the alkylation reaction in a continuous manner. A portion of the catalyst phase is withdrawn from alkylation zone 25 and passed through conduit 28 to catalyst regeneration zone 29, wherein hydrogen fluoride catalyst is regenerated and freed from excess contaminants such as water, hydrocarbons, etc. The regenerated catalyst is withdrawn from regeneration zone 29 and passed through conduit 30 into alkylation zone 25, wherein it is recombined with the major portion of alkylation catalyst.

Various conventional operations and equipment may not have been shown in the drawings or mentioned in the foregoing description, including for example, pumps, heat exchangers, reboilers, etc. Such necessary conventional equipment and its use in the process of the present invention will be obvious to one skilled in the art from the foregoing and from the detailed description of the preferred embodiments hereinafter provided.

DETAILED DESCRIPTION OF THE INVENTION

The olefinic reactant which is separated in the present inventive process to provide a 1-butene stream and a 1-butene-free stream of 2-butene and isobutylene may comprise only butene isomers, or may contain other hydrocarbons. It is contemplated that the olefinic feed employed in a conventional isoparaffin-olefin alkylation process is suitable for use as the olefinic reactant in the present process, in that such a conventional feed typically comprises a mixture of 1-butene, 2-butene and isobutylene. However, other materials may be present in the olefinic reactant to be separated, such as paraffins, naphthenes, and aromatics, as well as sulfur-containing and/or nitrogen-contining contaminant compounds. A conventional olefinic reactant, which would typically be utilized as the olefinic feed to an iso-paraffin-olefin alkylation process, might contain such other olefins as propylene or amylenes. Such an olefinic reactant is suitable for use in the process of the present invention. In addition, a suitable olefinic reactant may contain propane, normal butane, isobutane, pentanes, dienes, etc., which hydrocarbons are often present in minor amounts in a conventional olefinic reactant feed to an alkylation process. It is preferred that the olefinic reactant employed in the present inventive process contain at least about 15 vol. percent $C_4$ olefins.

In order for the synergistic effect of alkylating an isoparaffin with a mixture of 2-butene and isobutylene to be operative, it is essential that, at the least, there is a larger fracion of 2-butene than of 1-butene in the mixture. Hence, it is essential to process of the present invention that a 2-butene-isobutylene stream to be employed in an alkylation reaction in this process have at least more 2-butene than 1-butene. Subject to the above limitation, it is also preferred that such a 2-butene-isobutylene stream contain at least less than about 10 vol. percent 1-butene and preferably less than about 5 vol. percent 1-butene. The use of the term "substantially 1-butene-free" to describe a stream comprising 2-butene and isobutylene is intended to include 2-butene-isobutylene streams subject to the above limitations and, in addition, having less than about 3 vol. percent 1-butene therein. The use of the term "substantially 1-butene-free" to describe a stream is not intended to exclude from that stream such other materials as, for example, paraffins, propylene, amylenes, naphthenes, aromatics, hexenes, heptenes, etc., as well as minor amounts of contaminants such as nitrogen- or sulfur-containing compounds.

The separation of 1-butene from 2-butene and isobutylene may be performed in any suitable manner within the scope of the present invention. The method herein described, utilizing a crystalline aluminosilicate sorbent, is preferred, and has definite and apparent advantages over fractionation and other known methods for separating 1-butene from 2-butene and isobutylene. The normal boiling point of 2-butene is from about 10° F. to about 14° F. above the normal boiling point of 1-butene, and the normal boiling point of isobutylene is about 2° F. below that of 1-butene. Therefore, separation of 1-butene from a mixture containing 2-butene and isobutylene by fractionation is extremely difficult. By using a solid sorbent such as certain crystalline aluminosilicates, such difficulties can be avoided. Among the sorbents which can be used in the separation step of this invention are those generally referred to as crystalline aluminosilicates or zeolites, including both the natural and synthetic aluminosilicates. Particular crystalline aluminosilicates which may be employed as a sorbent in the present invention include aluminosilicates having cage structures in which $AlO_4$ and $SiO_4$ tetrahedra are intimately connected in an open three-dimensional network. The zeolite structure comprises $AlO_4$ and $SiO_4$ tetrahedra which are cross-linked by the sharing of oxygen atoms, with spaces between the tetrahedra occupied by water molecules. Dehydration of the zeolite results in crystals interlaced with the cells having molecular dimensions. The crystalline aluminosilicates are often referred to as molecular sieves when a separation to be performed using them is dependent essentially upon discrimination between molecular dimensions. In the present separation operation, the term "molecular sieves" is not suitable since the separation of butene isomers is dependent primarily on electrochemical attraction of different isomeric configurations rather than upon physical size differences in the isomeric molecules. In hydrated form, crystalline aluminosilicates may generally be represented by the formula in Equation 1 below:

$$M_{2/n}O:Al_2O_3:wSiO_2:yH_2O \quad (1)$$

where M is a cation which balances the electrovalence of the tetrahedra and is generally referred to as an exchangeable cationic site, $n$ represents the valence of the cation, $w$ represents the moles of $SiO_2$, and $y$ represents the moles of water. The cations may be any one of a number of cations which will hereinafter be described in detail.

Type X structured and Type Y structured zeolites, as the terms are used herein, include crystalline aluminosilicates having a three-dimensional interconnected cage structure and specifically defined by U.S. Pats. 2,888,244 and 3,130,007. The terms "Type X structured" and "Type Y structured" zeolites are intended to include all zeolites which have a general structure as represented in the above two cited patents and specifically include those structures containing various cations exchanged upon the zeolite. In the most limiting sense, these terms refer to Type X and Type Y zeolites. The Type X structured zeolites can be represented in terms of mole oxides as represented by the formula in Equation 2 below:

$$0.9 \pm 0.2 M_{2/n}O:Al_2O_3:2.5 \pm 0.5 SiO_2:yH_2O \quad (2)$$

where M represents at least one cation having a valence of not more than 3, $n$ represents the valence of M, and $y$ is a value up to about 9, depending upon the identity of M and the degree of hydration of the crystalline structure. The Type Y structured zeolites can be represented in terms of mole oxides for this sodium form as represented by the formula in Equation 3 below:

$$0.9 \pm 0.2 Na_2O:Al_2O_3:wSiO_2:yH_2O \quad (3)$$

where $w$ is a value of greater than about 3 up to 8, and $y$ may be any value up to about 9.

Sorbents which may be utilized in the present invention include not only the sodium form of Type Y zeolite, but also crystalline materials obtained from such a zeolite by partial or complete replacement of the sodium cation with other individual cations or groups of cations. Similarly, the Type X zeolite may also be ion-exchanged. Cationic or base exchange methods are generally known to those familiar with the field of crystalline aluminosilicate production. They generally includue contacting a zeolite with an aqueous solution of salts of the cations to be exchanged onto the zeolite. After the desired degree of exchange takes place, the sieves are removed from the aqueous solution, washed, and dried to a desired water content. Cation exchange may be effected by using individual solutions of desired cations placed on the zeolite or by using an exchange solution containing a mixture of cations, where two or more cations are to be placed on the zeolite. In normal cation exchange operations, cations can be placed on the zeolite in any concentration ranging from about 1% to about 100% of the original cations present. From knowledge of the empirical formula, including the silica to alumina ratio of the zeolite used, its water content, the type of zeolite used, e.g. Type X or Type Y structured, and the percentage of binder, if any, within the zeolite, it is possible to calculate the percentage of ion-exchange which has taken place. The percentage can be represented in terms of the weight percent of the zeolite which contains a cation when the atomic weight of the cation and its valence are determined. Cations are placed singly or in pairs upon the zeolite, the preferred cations may be present on the zeolite in high concentrations with various relatively small amounts of other cations present. It is preferred to reduce the non-preferred cation content to a level such that the cation does not function to substantially affect the selectivity of the sorbent for 1-butene. Cations which can be placed on the zeolite sorbent include the Group I-A, Group II-A, Group VIII and Group I-B metals of the Periodic Table of the Elements. Other cations not mentioned may be present in small quantities. For the purposes of the present process, cations to be used on the sorbent include cations selected from the above-mentioned groups with the limitation that the cation utilized is selective for 1-butene with respect to the other butene isomers. Of the above recited cations, potassium and barium are preferred and barium is especially preferred, since barium- and potassium-cation-containing zeolites selectively adsorb 1-butene over 2-butene and isobutylene.

The feed stock of olefinic reactant, comprising 1-butene, 2-butene and isobutylene, is broken down, in a sorption zone, into two components, an extract material comprising 1-butene and a raffinate material comprising 2-butene and isobutylene. The extract material is the component of the feed stock which is selectively adsorbed by the sorbent. Raffinate material in the present process includes the components of the feed stock which are not selectively adsorbed by the sorbent, i.e., isobutylene and 2-butene, but may also include extraneous components mentioned above. The extract material may also contain, in some instances, small amounts of contaminants such as aromatics, or nitrogen or sulfur-containing compounds. It is desirable to use a desorbent to remove the selectively adsorbed 1-butene from the sorbent. Basically, desorption includes passing either a gas or hydrocarbon material over the sorbent in the absence of at least most of the raffinate material and recovering an extract material by purging the extract material from the sorbent or replacing it by the desorbent. Specific desorbent materials which can be utilized in the present invention includue higher molecular weight $C_5$–$C_{15}$ olefins such as 1-octene which are easily separated from 1-butene. Desorbents which contain mixtures of normal olefins and isoparaffins have been found to possess desired qualities with respect to desorbing 1-butene from the sorbent. In specific embodiments in which liquid phase operations are maintained, a preferred desorbent for 1-butene desorption is a mixture of 20 vol. percent 1-octene and 80 vol. percent iso-octane. Other normally liquid desorbent materials can also be used, for example, aromatic hydrocarbons or paraffins. Still other desorbent materials which are easily separated from 1-butene, are such gases as hydrogen, methane, or, in some instances, steam or air, which can be used to purge the extract material from the sorbent.

Sorption conditions include temperatures from ambient up to about 350° F. or higher. In some instances, 350° F. may be too high, since catalytic activity of the sorbent may cause dimerization of 1-butene. Pressures can range from vacuum up to hundreds of atmospheres. Lower pressures and temperatures are preferred. It is preferred to maintain sorption conditions to provide liquid phase operation, although vapor phase operation may be utilized. Liquid phase operation includes the advantage of lower temperatures at given pressures, and the selectivity of the sorbent is enhanced for 1-butene at the lower temperature. Sorption conditions necessarily include contacting the olefinic reactant feed stock with a sorbent material. The sorbent then selectively adsorbs 1-butene in the feed stock, while leaving raffinate material, comprising 2-butene and isobutylene, in interstitial void spaces between the sorbent particles. Included in the separation operation can be a purge step in which the raffinate material is either purged from the sorbent by another hylrocarbon material or by a gas, leaving the adsorbed 1-butene within the sorbent particles. Sorption conditions for desorbing 1-butene include the pressure and temperature limitations described above in connection with adsorption operations. Additionally, sorption conditions for desorbing 1-butene include the passage of a desorbent material over the sorbent after the sorbent has been contacted with the feed stock and the raffinate of 2-butene and isobutylene withdrawn. Depending upon the separation scheme utilized, sorption conditions for desorbing 1-butene can include a gas purge at a higher temperature than utilized in adsorption combined with a reduced pressure. Using the above operations, 1-butene can easily be recovered from the adsorbent. Other sorption conditions can include the passage of a liquid desorbent material over the sorbent at conditions to effect the removal of 1-butene from the sorbent and replacement of the 1-butene on the sorbent by the desorbent material. The 1-butene is then recovered in admixture with the desorbent material, and is passed into a simple fractionating or separating means from which relatively pure 1-butene is recovered. Sorption conditions can include the removal of desorbent material from the sorbent. In these instances, the material which is adsorbed can be removed by a gas purge or vacuum desorption. The sorbent can then be re-contacted with olefinic feed stock at sorption conditions appropriate for adsorbing 1-butene.

The various flow schemes for embodiment of a sorption zone which can be utilized to effect the separation step in the process of this invention include the relatively simple swing bed operations in which two or more sorbent beds are connected so as to allow adsorption and desorption operations to take place in each of the beds simultaneously, with the switching of feed stock and desorbent materials between the individual sorbent beds to effect a continuous production of extract and raffinate materials. The separation step can also be effected using a single chamber through which alternate streams are passed. However, this method does not effect continuous production of 1-butene. Especially preferred schemes for the separation step are those generally referred to in the separation art as fixed bed countercurrent flow schemes in which a fixed bed of sorbent and a rotary valve are operated to effect a simulated moving bed operation. The general concept of such a flow scheme is disclosed in U.S. Pat. 2,985,589. It is preferable to use olefinic reactant feed stocks which contain from about a few percent 1-butene and a few percent total olefins content up to essentially pure $C_4$ olefins. A specific feed stock which can be utilized in the process of this invention contains about 35 vol. percent 1-butene, 32.5 vol. percent isobutylene and 32.5% 2-butene. Another suitable composition is a feed stock containing approximately 21 vol. percent 1-butene, 21 vol. percent isobutylene, 32 vol. percent 2-butene, with remaining feed stock components comprising paraffinic hydrocarbons.

When the olefinic reactant has been separated into a stream comprising 1-butene and a 1-butene-free stream comprising 2-butene and isobutylene, the mixture of 2-butene and isobutylene in the 1-butene-free stream is employed to alkylate an isoparaffin to provide an alkylation reaction product improved over that produced in previously disclosed alkylation processes. Suitable isoparaffinic reactants for use in the alkylation step of the present invention include isobutane, 2-methylbutane, 2-methylpentane, 3-methylpentane, 2,2-dimethylbutane, 2,3-dimethylbutane, and similar higher molecular weight isoparaffins, or mixtures of the foregoing. Isobutane is the preferred isoparaffinic reactant. The isobutane feed to a conventional isobutane-olefin alkylation process is suitable for use in the present process. Typically, such as conventional isobutane feed stock contains minor amounts of propane, normal butane, pentanes, olefins, etc., and such an isobutane feed stock is suitable for use in the present process. It is essential that the isoparaffinic reactant which is contacted with the mixture of 2-butene and isobutylene be substantially free from 1-butene, so that the synergistic effect of alkylating isobutane with 2-butene and isobutylene together is not impaired.

Various alkylation catalysts are known to be suitable for use in catalyzing the alkylation of an isoparaffin with an olefin. Examples of such catalysts which may be employed in the present inventive process include hydrogen fluoride, sulfuric acid, aluminum chloride, phosphoric acid, certain crystalline aluminosilicates, etc., with or without solid supporting materials such as alumina, silica, etc. In the present process, hydrogen fluoride is the preferred alkylation catalyst. A suitable hydrogen fluoride catalyst comprises at least about 70 wt. percent hydrogen fluoride and less than about 5 wt. percent water, preferably less than about 2 wt. percent water. Hydrogen fluoride alkylation catalysts containing catalyst-soluble hydrocarbons having molecular weights of about 100 to about 500, such as organic diluents or acid soluble oils, are suitable for use. Preferably, the hydrogen fluoride catalyst comprises about 80 to about 90 wt. percent hydrogen fluoride. A particularly preferred alkylation catalyst comprises about 90 wt. percent or more of hydrogen fluoride, less than about 10 wt. percent organic diluents and less than about 1 wt. percent water. The term organic diluents, as used herein is intended to encompass hydrocarbons soluble in hydrogen fluoride which have a higher molecular weight than the isoparaffinic reactant employed.

An alkylation zone employed in an embodiment of the present invention may be any means which will suitably contain the alkylation reaction mixture at alkylation conditions. Various suitable alkylation vessels are known to prior art. The alkylation zone may comprise a continuous zone for contact and separation of catalyst and hydrocarbon phases or the zone may be separated into distinct vessels with means for transferring alkylation reaction mixture to the separation vessel. Alkylation conditions in the alkylation zone include a temperature in the range from about 0° F. to about 200° F. and a pressure in the range from about 1 atmosphere to about 50 atmospheres. Alkylation conditions preferably include a temperature of about 0° F. to about 75° F. and a pressure sufficient to maintain the reactants, catalyst and alkylation reaction products in the liquid phase. Means for thoroughly admixing the catalyst with the reactants and a method for withdrawing heat from the alkylation zone should be included. For example, the heat generated in the alkylation reaction may be withdrawn directly from an alkylation zone by indirect heat exchange between cooling water and the reaction mixture. In another embodiment, the catalyst to be contacted with the reactants may be cooled beforehand to act as a heat sink in the alkylation reaction. Also suitable is a method for cooling the alkyllation zone in which the hydrocarbons to be introduced to the alkylation zone are cooled to act as a heat sink in the alkylation zone. Means for separating the hydrocarbon phase from the catalyst phase are well known in the art of alkylation processes. Suitable separation means may be continuous with or distinct from the reaction zone employed in a particular embodiment. Conditions during a settling operation in the alkylation process are substantially the same as those in the alkylation conditions above, with respect to temperature and pressure. The hydrocarbons and the catalyst are preferably maintained in the liquid phase.

this composite alkylate was analyzed, it was found to have a clear research octane number of 96.1 and a clear motor octane number of 94.1. In Run 6, an olefinic reactant composed of 50 vol. percent 1-butene and 50 vol. percent isobutylene was reacted with isobutane at alkylation conditions otherwise identical to those employed to produce the separate alkylates in Run 5. When the alkylate produced from the 1-butene-isobutylene mixture was analyzed, it was found to have a clear research octane number of only 94.8 and a clear motor octane number of only 93.1. The composite alkylate of Run 5 and the mixed butenes alkylate of Run 6 were further compared, and the superiority of separately alkylating 1-butene and isobutylene was further demonstrated in that the mole ratio of trimethylpentanes to dimethylhexanes

TABLE I

| | Run | | | | | |
|---|---|---|---|---|---|---|
| Description | 1 mixed olefins feed | 2 separate olefin feeds | 3 mixed olefins feed | 4 separate olefins feed | 5 separate olefin feeds | 6 mixed olefins feed |
| Process conditions: | | | | | | |
| Reactor temp., °F | 68 | 68 | 68 | 68 | 68 | 68 |
| Isobutane/olefin mole ratio | 12 | 12 | 12 | 12 | 12 | 12 |
| Acid/hydrocarbons vol. ratio | 1.5 | 1.5 | 1.5 | 1.5 | 1.5 | 1.5 |
| Catalyst analysis, wt. percent: | | | | | | |
| Water | 1.0 | 1.0 | 1.0 | 1.0 | 1.0 | 1.0 |
| Soluble hydrocarbons | 10 | 10 | 10 | 10 | 10 | 10 |
| Acidity | 89 | 89 | 89 | 89 | 89 | 89 |
| 1-butene in olefin feed, wt. percent | | | | | 50 | 50 |
| 2-butene in olefin feed, wt. percent | 50 | 50 | 25 | 25 | | |
| Isobutylene in olefin feed, wt. percent | 50 | 50 | 75 | 75 | 50 | 50 |
| Residence time, sec | 600 | 600 | 600 | 600 | 600 | 600 |
| Alkylate properties: | | | | | | |
| Research octane number (clear) | 98.8 | 98.7 | 98.7 | 98.4 | 96.1 | 94.8 |
| Motor octane number (clear) | 96.6 | 96.2 | | | 94.1 | 93.1 |
| TMP/DMH mole ratio | | | 15.0 | 13.5 | 5.4 | 3.5 |

Examination of the data presented in Table I indicates that alkylation of isobutane with mixed 2-butene and isobutylene provides an alkylation reaction product having properties superior to that produced when isobutane is alkylated with the two olefins separately under the same process conditions and the alkylation reaction products are combined. In Run 1, an olefinic feed composed of a mixture of 50 vol. percent 2-butene and 50 vol. percent isobutylene was alkylated with isobutane, producing an alkylation reaction product having a clear research octane number of 98.8 and a clear motor octane number of 96.6. In Run 2, 2-butene and isobutylene were reacted separately with isobutane under process conditions otherwise identical to those in Run 1, and subsequently the alkylation reaction products produced by alkylation of the olefins separately were combined to provide an alkylation reaction product containing 50 vol. percent of the 2-butene-derived alkylate and 50 vol. percent of the isobutylene-derived alkylate. Analysis of the combined product showed a clear research octane number of only 98.7 and a clear motor octane number of only 96.2. In Run 3, isobutane was alkylated with an olefin feed containing 75 vol. percent isobutylene and 25 vol. percent 2-butene. The alkylation reaction product was found to have a clear research octane number of 98.7 and a mole ratio of trimethylpentanes to dimethylhexanes of 15.0. In Run 4, isobutane was alkylated separately with 2-butene and with isobutylene under alkylation conditions otherwise identical to those in Run 3 and a composite alkylation product containing 75 vol. percent isobutylene-derived alkylate and 25 vol. percent 2-butene-derived alkylate was prepared. The composite product was found to possess a clear research octane number of only 98.4 and a trimethylpentanes to dimethylhexanes mole ratio of only 13.5. The data of Table I, thus, clearly show that the product obtained from alkylation of a mixture of 2-butene and isobutylene is superior to that produced by separate alkylation of these isomers. In Run 5, isobutane was alkylated with 1-butene, and, separately, with isobutylene. A composite alkylate product composed of 50 vol. percent of the 1-butene-derived alkylate and 50 vol. percent of the isobutylene-derived alkylate was made up. When in the alkylate from Run 5 was found to be 5.4, while the mole ratio in the alkylate produced from the 1-butene-isobutylene mixture was found to be only 3.5. Thus, the beneficial effect of excluding 1-butene from the olefinic reactant employed in an alkylation process, and of alkylating 1-butene separately and combining the resulting alkylation reaction product with that derived from alkylation using 2-butene and isobutylene is clearly demonstrated.

The 1-butene which is separated from 2-butene and isobutylene in the present process is isomerized to provide a further source of 2-butene and isobutylene and subsequently alkylated in co-mixture with the 2-butene and isobutylene provided by the initial separation step. In utilizing isomerization of 1-butene to provide 2-butene and, possibly, isobutylene, it may be found that only a fractional part of the 1-butene is isomerized when it is passed through the isomerization zone. In this case, at least a portion of the effluent from the isomerization zone can advantageously be passed to the 1-butene separation step and processed with or without fresh olefin reactant to separate 1-butene from 2-butene and isobutylene.

To isomerize 1-butene to provide 2-butene and, possibly, isobutylene, the 1-butene recovered from the separation step is contacted with an isomerization catalyst in an isomerization zone at isomerization conditions. Isomerization catalysts which can be employed in the isomerization operation of the present invention include catalysts which produce a shift of the olefinic bond to form 2-butene from 1-butene and also include catalysts which produce skeletal isomerization of 1-butene to form isobutylene. Various catalysts have been found suitable, including, for example, alumina, silica, zirconia, chromium oxide, boron oxide, thoria, magnesia, aluminum sulfate, and combinations of two or more of the above. Also employed have been acidic catalysts such as sulfuric acid, phosphoric acid, aluminum chloride, etc., either in solution or on a solid support. Also suitable for use in the isomerization operation as an isomerization catalyst is a boron halide-modified metal oxide, e.g. boron halide-modified substantially anhydrous alumina. Thermal isomerization may be utilized, but suffers from excessive production of side products.

A preferred isomerization catalyst for use in the isomerization operation of the present invention comprises a crystalline aluminosilicate combined with a substantially anhydrous boron halide. Preferably, the aluminosilicate employed in the catalyst support has pores of about 4 to about 15 angstroms in cross-sectional diameter. The aluminosilicates are treated to improve their catalytic activity by techniques such as ion-exchange with suitable cations and thermal treatment. Ordinarily, the aluminosilicates employed in the catalyst are synthetically prepared in the alkali metal form (usually sodium). The aluminosilicate may be ion-exhanged with polyvalent cations such as calcium, magnesium, beryllium, rare earths, etc., to replace a substantial amount of the monovalent cations. This causes one polyvalent cation to be associated with more than one aluminum centered tetrahedra and if these tetrahedra are spread sufficiently far apart, due to the presence of silicon-centered tetrahedra, areas of local electrical charge will be formed which aid in promoting catalytic reactions. Another treating technique to increase the catalytic activity of the aluminosilicate is to ion-exchange with ammonium ions followed by thermal treatment, preferably at about 575° F. to convert the crystalline aluminosilicate to the hydrogen form. Among the crystalline aluminosilicates that are suitable are the hydrogen and/or polyvalent forms of faujasite and mordenite and especially preferable is the hydrogen form of mordenite. The concentration of crystalline aluminosilicate may be as high as 100% or the crystalline aluminosilicate may be held within an amorphous matrix which may be selected from the group consisting of silica, alumina, and silica-alumina mixtures. As stated, the catalyst comprises a crystalline aluminosilicate combined with a boron halide. The boron halide may be combined with the crystalline aluminosilicate at temperatures in the range from about 0° F. to about 600° F. and at a pressure of about 1 atmosphere to about 200 atmospheres. When the boron halide utilized is boron trifluoride, fluoride concentrations of about 0.01 wt. percent to about 30 wt. percent are preferred. Boron trifluoride is particularly preferred as the boron halide for use in the present catalyst, although the catalyst is not restricted to its use but may employ any of the known boron halides insofar as they are adaptable.

The preferred method by which the operation of the isomerization step of the present invention may be effected is a continuous type operation. One particular method is a fixed bed operation in which 1-butene is continuously charged to an isomerization zone containing a fixed-bed of catalyst, the zone being maintained at isomerization conditions including a temperature in the range from about 0° F. to about 800° F. or more, and a pressure of about 1 atmosphere to about 200 atmospheres or more. The preferred catalyst is suitable for either gas phase or liquid phase reactions so that flow may be maintained at a liquid hourly space velocity (volume of charge per volume of catalyst per hour) in the range from about 0.1 to about 20 or more, preferably in the range from about 0.1 to about 10, or a gaseous hourly space velocity in the range from about 100 to about 1500 or more. The isomerization zone may comprise an unpacked vessel or coil or may be lined with a packing material. The charge passes through the catalyst bed in either an upward or downward flow and the isomerized butenes are continuously withdrawn from the reactor and recovered. It is also contemplated within the scope of this invention that gases such as boron halides, helium, hydrogen, nitrogen, argon, etc., may be continuously charged to the isomerization zone as desired. Another continuous type operation comprises a moving bed type in which the 1-butene and the catalyst bed move co-currently or countercurrently to each other while passing through the isomerization zone. Still another type of operation which may be used is a batch-type operation in which a quantity of 1-butene and catalyst are placed in an appropriate vessel. The vessel is then heated to the desired temperature and maintained thereat for a predetermined residence time at the end of which the vessel and contents thereof are cooled and the isomerized butenes are recovered.

I claim as my invention:

1. A process for producing an alkylation reaction product from an isoparaffinic reactant and an olefinic reactant mixture containing 1-butene, 2-butene and isobutylene, which process comprises the steps of:
    (a) contacting said olefinic reactant mixture with a solid sorbent to selectively adsorb said 1-butene thus providing a raffinate mixture of 2-butene and isobutylene;
    (b) desorbing said 1-butene from said sorbent;
    (c) contacting at least a portion of said 1-butene with an isomerization catalyst in an isomerization zone at isomerization conditions to form an effluent comprising 2-butene;
    (d) contacting at least a portion of said raffinate mixture of 2-butene and isobutylene and at least a portion of the 2-butene from said isomerization zone with said isoparaffinic reactant and with an alkylation catalyst in an alkylation zone at alkylation conditions; and
    (e) recovering said alkylation reaction product from the reaction effluent from said alkylation zone.

2. The process of claim 1 further characterized in that said solid sorbent is a crystalline aluminosilicate selected from the group consisting of Type X and Type Y zeolites containing a cation selected from the group consisting of potassium and barium at cationic sites within the zeolite.

3. The process of claim 1 further characterized in that at least a portion of the effluent from said isomerization zone is contacted with said solid sorbent.

4. The process of claim 1 further characterized in that said isoparaffinic reactant is isobutane and said alkylation catalyst is hydrogen fluoride alkylation catalyst.

5. The process of claim 1 further characterized in that said raffinate mixture is substantially 1-butene free.

6. The process of claim 1 further characterized in that said isomerization catalyst comprises a crystalline aluminosilicate combined with a substantially anhydrous boron halide.

7. The process of claim 7 further characterized in that said aluminosilicate is mordenite and said boron halide is boron trifluoride.

References Cited
UNITED STATES PATENTS

| | | | |
|---|---|---|---|
| 2,894,998 | 7/1959 | Hess et al. | 260—677 AD |
| 2,971,993 | 2/1961 | Kimberlin, Jr. et al. | 260—677 AD |
| 2,502,015 | 3/1950 | Matuszak | 260—683.49 |
| 2,594,343 | 4/1952 | Pines | 260—683.49 |
| 3,078,321 | 2/1963 | Van Pool et al. | 260—683.49 |
| 3,331,882 | 7/1967 | Mattox | 260—677 A |
| 3,467,728 | 9/1969 | Hervert | 260—683.2 |

DELBERT E. GANTZ, Primary Examiner

G. J. CRASANAKIS, Assistant Examiner

U.S. Cl. X.R.

260—677 AD, 683.2, 683.43